United States Patent [19]
Prusik et al.

[11] Patent Number: 6,042,264
[45] Date of Patent: *Mar. 28, 2000

[54] TIME-TEMPERATURE INDICATOR DEVICE AND METHOD OF MANUFACTURE

[75] Inventors: Thaddeus Prusik, Stroudsburg, Pa.; Raymond M. Arnold, Harrisonville; Stephen C. Fields, Mendham, both of N.J.

[73] Assignee: Lifelines Technology, Inc., Morris Plains, N.J.

[ * ] Notice: This patent is subject to a terminal disclaimer.

[21] Appl. No.: 08/976,260

[22] Filed: Nov. 21, 1997

Related U.S. Application Data

[62] Division of application No. 08/546,919, Oct. 23, 1995, Pat. No. 5,709,472.

[51] Int. Cl.[7] ............................. G01K 3/04; G01K 11/06; G01K 13/00; G01K 1/14
[52] U.S. Cl. .......................... 374/106; 374/104; 374/160; 374/150; 374/141; 116/219
[58] Field of Search ..................... 374/150, 106, 374/160, 102, 104, 141; 116/219

[56] References Cited

U.S. PATENT DOCUMENTS

| | | | |
|---|---|---|---|
| 2,379,459 | 7/1945 | Schreiber et al. | 374/106 |
| 3,055,759 | 9/1962 | Busby et al. | 374/106 |
| 3,242,733 | 3/1966 | Johnson | 374/160 |
| 3,243,303 | 3/1966 | Johnson | 374/106 |
| 3,414,415 | 12/1968 | Broad, Jr. | 116/219 |
| 3,430,491 | 3/1969 | Gignilliat, III | 374/106 |
| 3,981,683 | 9/1976 | Larsson et al. | 374/106 |
| 4,057,029 | 11/1977 | Seiter | 374/106 |
| 4,353,990 | 10/1982 | Manske et al. | 374/106 |
| 4,448,548 | 5/1984 | Foley | 374/160 |
| 4,509,533 | 4/1985 | Chervitz | 374/162 |
| 4,538,926 | 9/1985 | Chretien | 374/150 |
| 5,378,430 | 1/1995 | Nieves et al. | 374/160 |

*Primary Examiner*—Andrew Hirshfeld
*Attorney, Agent, or Firm*—Arthur J. Plantamura

[57] ABSTRACT

A time-temperature indicator label for measuring the length of time to which a product has been exposed to a temperature above a pre-determined temperature is provided. The period of time of exposure is integrated with the temperature to which the indicator is exposed. The label is a composite of a plurality of layers adapted to be adhered at its underside to a product container. The label includes a printable surface layer, a longitudinal wicking strip that is adhered underneath the surface layer substantially at the opposite extremities only of the wicking strip and a lower substrate layer forming an envelope with said surface layer. A heat-fusible substance, which melts and flows above a pre-determined temperature, is applied on the surface of the wicking strip contiguous to at least one of the ends of the wicking member. When the heat-fusible substance is exposed to a temperature above the pre-determined temperature, the heat-fusible substance flows along the length of the wicking member. The label has a printable surface layer and is sealed at its peripheral edge to the peripheral edge of the substrate layer. These layers encapsulate the wicking member and the heat-fusible substance. The surface layer is provided with a sight window at an intermediate location over the wicking member through which the progress of flow on the wicking member is observed.

5 Claims, 3 Drawing Sheets

TIME-TEMPERATURE INDICATOR DEVICE AND METHOD OF MANUFACTURE

This application is a division of application Ser. No. 08/546,919, filed Oct. 23, 1995 now U.S. Pat. No. 5,709, 472.

FIELD OF THE INVENTION

This invention relates to a novel, easily applied time-temperature indicator label that has a thickness and flexure essentially comparable to those features of conventional labels. The invention provides an economical and practical, self-adhesive means to measure elapsed time above a pre-determined temperature. The label of this invention possesses sufficient suppleness to allow attachment by means of a self-adhesive material to a variety of package shapes and contours, such as, for example, use as a band label on a bottle of wine, or as a label on a package of food. The label comprises a porous strip of wicking material that is incorporated within and attached at both ends to a supporting film, the strip of wicking material being completely sealed around its perimeter within the supporting film. The wicking material carries a heat-fusible substance capable of migrating along said wick at temperatures above the melting range of the heat-fusible substance. The visibility of migration of the heat-fusible substance is enhanced by a dye or dye forming combination. The progress of the migration is viewed through a clear portion, i.e. a window, in an opaque surface on which conventional label printing is applied. The viewing window is contained in an unprinted portion to enable the determination of the extent of migration of the heat-fusible substance.

BACKGROUND OF THE INVENTION

The quality and safety of many temperature-sensitive perishable products can be compromised by improper temperature control during processing, distribution, and storage. International governmental agencies have become increasingly active in safeguarding consumers of perishable products by the passage of various food and drug regulations. A number of these regulations deal with monitoring the exposures of temperature-sensitive products during the different phases of the products' life, from the time of manufacture to the ultimate consumption of the goods. In the U.S. regulations are pending that require storage of fresh meat and poultry below 4.4° C. (40° F.), and fresh eggs below 7.2° C. (45° F.), EEC directive 93/43 has established maximum storage temperature conditions for fish, processed foods, pasteurized dairy products, and frozen foods.

In response to the increase in regulations and to the increase in consumer awareness of the possible consequences of poor temperature control, some food processing companies, trucking companies, and supermarket chains have begun utilizing the HACCP (Hazard Analysis Critical Control Point) Systems approach to food safety. This program involves hazard analysis, identification of critical control points, determination of the critical limits at those points, methods to routinely monitor those limits during commercial activities, corrective action procedures, appropriate record keeping and verification procedures. One of the critical control points is temperature monitoring during the different times in a product's life. Such monitoring programs involve measuring temperatures in processing and storage locations, in trucks, on loading/unloading docks, and on retail shelves. Chart recorders and electronic data loggers can be used to produce records that show compliance within the required storage temperature range. However, such monitoring methods suffer because they can only monitor the area where the probe is located. Even if several probes are used, this provides only a one point in time or "snapshot" of the true temperature distribution. It is also well known that temperatures within warehouses, trucks, and retail refrigeration units can vary widely even when the items are in close proximity to each other. These differences can be due to poor air circulation, improper stacking of products in the cooler/freezer, or malfunctioning refrigeration equipment. Relying on temperature recorders or probes is also inadequate because the temperature monitoring equipment does not follow the product to the ultimate consumer, where additional abuse may occur.

In addition to the recording devices described above, instantaneous temperature measurements can be made with a thermometer or other suitable temperature indicating instrument. It is not practical to routinely make these measurements on a "spot check" basis on individual packages because of the time involved in making the measurements and the possible alteration of the product due to making the measurement, e.g., piercing a package of ground beef with a temperature probe. Instantaneous temperature indicators could also be attached to products when they are manufactured. These indicators would be useful in determining if a critical temperature has been exceeded but would not give an indication of the extent or length of time to which a product is exposed above a given temperature. This is important because, while for example a product may still be usable if exposed at a temperature of say 30° C. (86° F.) for up to several hours, this same product would be completely unusable and should be discarded when exposed to that temperature level for any appreciable length of time in excess of six hours.

The U.S. Government has required by law that proper handling and cooking directions be printed on labels applied to individual packages of fresh meat, poultry, and fish products to warn the consumer about the potential hazardous nature of the of those products and to give directions regarding proper temperature storage conditions. The device of this invention allows the signaling of a temperature abuse condition when the indicator label is attached to a perishable product.

PRIOR ART

There are numerous disclosures on temperature limit indicators, temperature limit indicators with lapsed time, time-temperature integrating indicators, and dual functional temperature indicators. Indicators known in the art have not been readily accepted for use in enforcing regulations because of the cost of the indicating devices and because the devices did not directly give an indication of temperature exposure as described in the regulation. Regulations have been enacted that require certain products to be stored below critical temperatures. For example, fresh poultry must be stored below 40° F.

Illustrative of prior art full history, time-temperature integrating indicators are those described in U.S. Pat. Nos.: 3,999,946; 5,085,802; 3,768,876; 4,292,916; 4,212,153; 3,344,670; 3,966,414; and 5,053,339. Such described indicator devices, in general, signal an expiration by changing color; the mechanisms of such color change being due to polymerization reactions, chemical reactions, or diffusion reactions. Full time-temperature integrating devices described in the prior art generally accumulate temperature exposures above and below any regulated critical temperature, which can give a signal of overexposure even though the product never exceeded the critical temperature limit by approaching a time limit in conjunction with the temperature exposure. Further, such devices might not signal an expired condition if the pre-determined limit had been exceeded because the devices develop a signal from an integrated exposure that generally will not react very quickly above said pre-determined temperature.

Irreversible, color-changing, temperature indicating devices that expire immediately after a pre-determined temperature has been exceeded are available in the marketplace. As such for example, are the self-adhesive temperature labels such as sold by Omega Engineering, Inc. Stamford, Conn. among other companies. These devices are for threshold temperatures normally in excess of about 38° C. (100° F.). For application in the chilled and frozen temperature range, indicators are available that can be activated below the signal temperature and placed on a product. Small, self-adhesive labels containing dyed meltable material in microcapsules printed behind a porous substrate are available for use in the refrigerated and frozen temperature ranges. Indicators of this kind are sold under the ThawAlert Indicator name by Thermographics Measurements Limited, South Wirral, England. Because these indicator labels change irreversibly and instantly upon exposure to a pre-determined temperature, their practical value is severely limited. For example, if an indicator such as this is attached to a package of ground meat and properly stored at a supermarket, it will likely change color before the customer either gets out of the store, or reaches home, or puts a non-refrigerated item on top of the meat. These instantaneous or momentary exposures to elevated temperatures generally would not cause a safety or quality concern even though the indicator shows otherwise. Another example of a situation in which instantaneous indicators do not work well is during defrost cycles when freezers and refrigerators warm for a short time. Typical defrost cycles are 15 minutes every 12 hours. Another scenario that demonstrates the impracticality of an indicator of this kind is as follows: assume there is an entire section of a supermarket refrigerated display case containing meat, poultry, fish and dairy products with the instantaneous indicator devices attached. It is readily conceivable that a devious individual could walk down the aisle and simply touch each food product at the indicating spot for a matter of seconds, causing the color indicator to trigger and wrongfully display the contents of the display case as temperature abused. Instantaneous temperature indicator devices are of severely limited practical value.

Another prior art temperature indicator device is that of U.S. Pat. No. 3,954,011 to Manske which incorporates a porous fluid carrying pad, a wick material for said fluid, and an indicator means whereby the progress of the fluid along the wick material can be visibly indicated. Devices of this type have been marketed by Minnesota Mining and Manufacturing Company of St. Paul, Minn. under the brand name MonitorMark™ indicating devices. The device incorporates a removable impervious layer to separate the fluid carrying pad from the wick material. The device is activated by removing the impervious layer thereby allowing the pad and wick to come into intimate contact and allow fluid migration above a pre-determined temperature. The construction of the described device is not supple nor is the wick material sealed from external contaminants. Thus, if the indicating device of Manske is subjected to a humid environment or placed in water, the wicking material will alter its properties and not give a proper indicia. Specimens of the devices made in accordance with U.S. Pat. No. 3,954,011 purchased under the brand name MonitorMark measured 9.8 cm long, 1.9 cm wide, and 2.3 mm thick and contain cardboard as a supporting means which prevents the device from bending.

U.S. Pat. No. 5,120,137 issued to Ou-Yang, is an improvement of the indicating device of Manske. The improvement is in the change in structure of the wicking material to one being made of a generally hydrophobic material making the indicating device generally independent of changes in ambient humidity. The devices of Ou-Yang lack suppleness and necessarily cannot have a perimeter seal because of the nature of the activation step, the removal of an interleaved impervious sheet to allow contact between the fluid pad and the porous wick.

U.S. Pat. No. 5,368,905 issued to Ohno requires activation by the rupture of a projection containing a heat-fusible substance encapsulated above a wicking material sealed between plastic sheets. The indicator is activated by light finger pressure to rupture the capsule containing the heat-fusible substance. The size of the encapsulating projection in the disclosure is approximately 8 mm in diameter and 5 mm in height. The fact that only light finger pressure is needed to rupture the projection containing the heat-fusible substance above the wick thereby activating the device shows that there was is no intention of having the device be pliable. A pliable indicator of this construction would necessarily activate prior to application on the article being monitored. Supplied samples of the device made in accordance with U.S. Pat. No. 5,368,905 measure 4.5 cm long, 2.5 cm wide, and 0.9 cm thick. The supporting plastic layer is composed of a rigid plastic material that will not bend.

U.S. Pat. No. 3,479,877 describes an indicator device incorporating a heat-fusible tablet on one end of a wicking strip. However, that device has relatively massive cross section. The wick material is not laminated to another surface but is separated by a spacer having a thickness of ⅛" thick. The wick is described as 2¾" long and ¼" wide with a fold on one end and is provided with a rigid cap protecting the heat-fusible tablet and a vent hole for equalizing pressures thereby presenting a relatively, non-pliable construction.

U.S. Pat. No. 4,038,873 describes a completely sealed, lapsed time above critical temperature indicator device containing a frangible packet of heat-fusible material and a dye coated on one end of a porous sleeve. In that device a packet which is inserted in a porous sleeve is ruptured and releases the heat-fusible substance, thereby saturating the porous sleeve. The dye diffuses on the saturated porous sleeve and migrates across the length of the sleeve.

U.S. Pat. No. 4,931,420 describes a multilayered time, above critical temperature, indicator system that incorporates the circumferential application of an adhesive system around the color forming ink compositions. A heat-fusible material diffuses through layers to yield a color change due to temperature exposures.

U.S. Pat. No. 4,448,548 (Re. 34,515) contains a fusible material in a tablet form deposited in an embossment contained on an aluminum backing, a wicking paper, and a clear plastic material covering the assembly. The device is permeable. The tablet melts in the presence of steam causing travel of the melted material along the wick. The article is used to monitor the steam sterilization process.

An indicator device branded "ChillChecker" that signals above a threshold temperature is available from Thermographics Measurements Limited, South Wirral, England. The device comprises a dome shaped disk having a 32 mm diameter and thickness of 11 mm. The device has a bottom layer containing a meltable substance that is physically separated from a top wicking layer that is embedded in the plastic dome structure. The device is activated by pressing down on the dome, permanently collapsing its central portion, to allow contact of the central area of the wicking paper with the heat meltable material contained in the bottom layer. Above a pre-determined temperature, the dyed heat meltable material will flow concentrically from the central region towards the perimeter.

U.S. Pat. No. 4,538,926 describes a thin, supple, temperature sensing element containing cholesteric liquid crystals that indicate at any given moment the temperature of the container. The object being to show when the appropriate temperature of use of the liquid in the bottle is achieved. The device is not a time-temperature indicator which can monitor the length of time above a pre-determined temperature.

Telatemp Corporation of Fullerton, Calif. markets time above temperature devices that signal between several minutes to one hour above 34° or 42° C. The Telatemp device comprises a circular reservoir pad containing a heat-fusible substance in contact with the center of a porous wicking material. Above a threshold temperature, the dyed fusible material penetrates the porous wick in the center giving rise to a rapid color development followed by the concentric permeation of the color towards the perimeter of the wicking material due to continued exposure. The device may be applied to variety of packages to signal an alert condition that the product may have been abused.

It is thus apparent that there is the need for a time lapse above a temperature indicating device which is reliable, economically feasible and is sufficiently supple to attach to a variety of package surfaces including but not limited to meat, poultry, fish and egg-containing packages, or bottles or vials made from glass or plastic. In the case of most applications a lapsed time of an hour to several hours is sufficient to show that the temperature has been exceeded and signal an alert condition, but also long enough to prevent premature, inadvertent, or premeditated indication of an abuse condition. Similar devices have been described in the prior art but have been lacking for a variety of reasons. The current invention improves upon the prior art.

Certain other products that normally are not refrigerated, but cannot tolerate storage above a critical temperature for a given time like wines, champagnes, chocolates, reactive chemicals, and certain pharmaceutical products would also benefit from the devices of this invention.

SUMMARY OF THE INVENTION

It is the object of the invention to provide a time-temperature indicator label for signalling the exposure of a product when such exposure has exceeded the permissible exposure for a period of time above a pre-determined temperature. The label is devised so that time exposure is integrated with temperature and functions such that maximum permissible exposure may occur after a relatively shorter period of time when exposure is at a relative higher temperature or for a permissible longer period of time when exposure is at a lower temperature.

It is another object of the invention to provide a novel method of fabricating a time-temperature indicator label having a relatively thin or nearly conventional thickness and with sufficient suppleness to allow attachment to a variety of package shapes and contours. The label is formed by use of a porous wicking material that is smaller than the outer dimension of a label supporting film and is attached at both ends to the supporting film: the wicking material being completely sealed around the perimeter with a heat-fusible substance applied to at least one end of the wicking material said substance being capable of migrating along said wicking material during the time when the label is exposed to a temperature above the melting range of the heat-fusible substance. A dye or a component of dye forming combination in the heat-fusible substance aiding in the visibility of the heat-fusible substance after the migration of the substance along the length of the wicking material. The wicking material containing the applied heat-fusible substance is enveloped and sealed within an opaque viewing surface with a portion or portions transparent to enable the determination of the extent of migration of the heat-fusible substance.

In a related embodiment of the invention, a small amount of microcapsules containing a heat-fusible substance is applied to the label wicking material at least on one end and preferably contained in a protected recess; this construction enables the indefinite shelf life for the time-temperature indicator label prior to use, which is activated only after sufficient pressure is applied on the microcapsule portion of the label and thereby making the label in a condition susceptible to measuring ambient exposure.

Theses and various additional objects and advantages of the present invention will become apparent to those skilled in the art from the herein provided figures of the drawing and description.

DETAILED DESCRIPTION OF INVENTION

Figure 1:
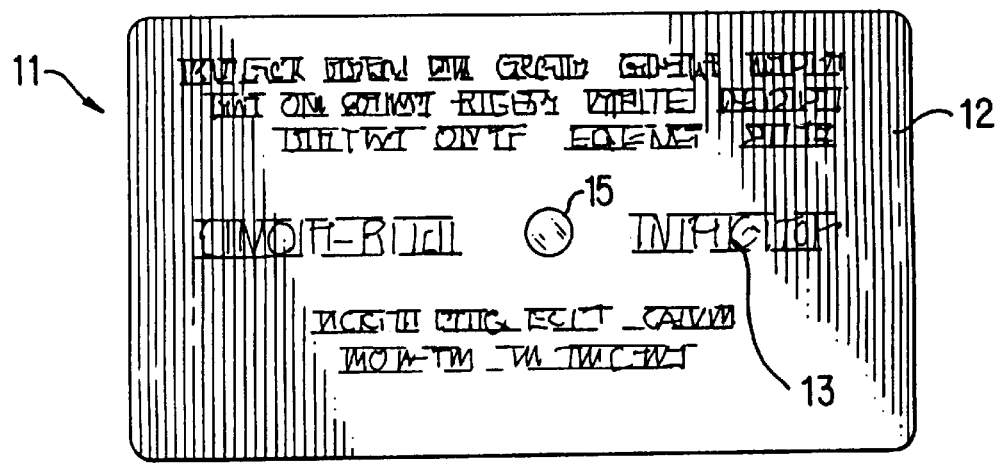
FIG. 1 is a plan view of a time-temperature indicator device according to the invention illustrating conventional printing on the surface and a viewing window formed at an intermediate location along the length of the device through which the heat-fusible material which has progressed along a wicking strip contained within the label can be observed.
Figure 2:
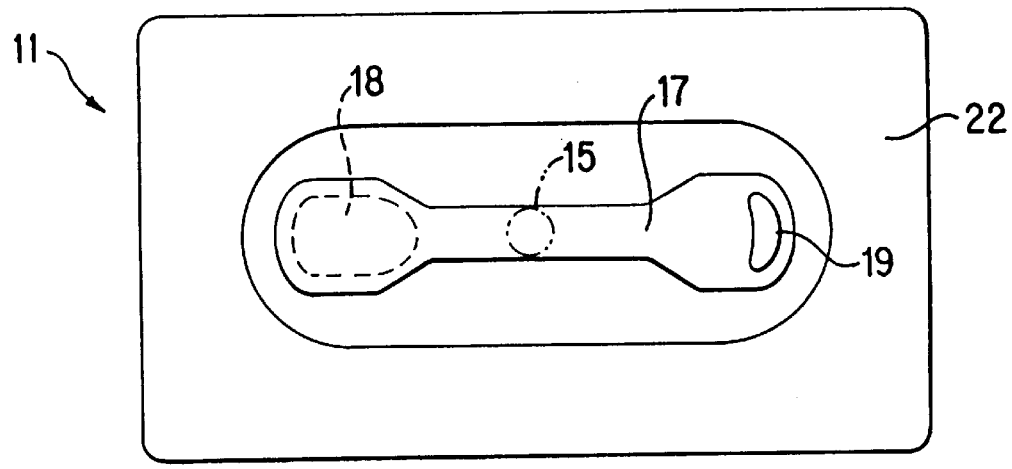
FIG. 2 is a plan view of the indicating device shown in FIG. 1 with the surface film or layer removed showing the substrate, a longitudinal strip of wicking material superimposed on the substrate and entirely within an inner pattern portion of the extremities of the substrate, the surface layer of the label being sealed to the portion outside of the inner pattern. The wicking material strip being secured at its end extremities and containing a heat-fusible material on at least one of its ends.
Figure 3:
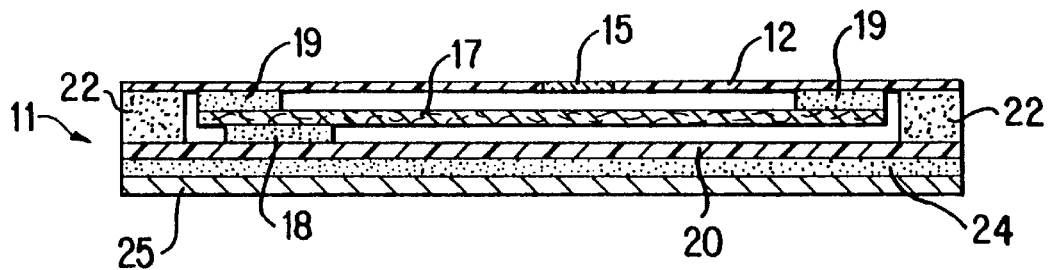
FIG. 3 is an enlarged cross-sectional illustration of the invention showing the various superimposed elements that comprise the device of the invention illustrated in FIGS. 1 and 2.

The general construction of the indicating device consists of a top sheet or film which preferably comprises an imprintable plastic material underneath of which is contained a longitudinal porous wicking member attached to the underside of the sheet preferably at its extremities, a heat-fusible material deposited on one extremity of the porous member, a dye soluble in the heat-fusible material, a bottom sheet adhered to the top sheet around the wicking member, heat-fusible material and dye to form a perimeter seal around the wicking member, the fusible material/dye combination, and an adhesive layer on the outside of the bottom sheet to allow attachment of the device to a product. A removable release (peelable) liner is applied over the adhesive layer which is removed when the label is affixed by means of this adhesive layer to a product container. Referring more particularly to the drawing of a conventional appearing label 11 is shown in FIG. 1, the surface layer of which is suitable to have applied thereon contrasting imprinted information 13. The surface layer 12 preferably comprises of an opaque surface layer or film and is provided with a viewing window 15 at an intermediate location along the length of a wick material 17, see FIGS. 2 and 3, on which a heat-fusible material 18 is applied. As illustrated in detail in the cross-sectional view of FIG. 3 a top sheet cover layer preferably of a clear, flexible imprintable plastic material which may be made from a variety of types of plastics including but not limited to polyethylene, polypropylene, polycarbonates, polyesters, polyamides, polyurethanes, polyvinyl chlorides, cellulosics, and cellophanes and may be employed as a label surface layer 12. The layer 12 can be untreated, or treated on one or both surfaces to increase printability or when formed of a material to be heat sealed to the bottom layer 20. The surface layer or film 12 may be a co-extrusion of a variety of plastics. Affixed to the underside of the surface layer 12 is the wicking element 17 which preferably has a longitudinal dimension and is preferably attached by adhesive contact area 19 to the surface layer 12 at the extremities of the wick element 17. The porous wicking member 17 must be selected so as to allow the reproducible permeation of the heat-fusible, organic material 18 along the member 17 in the amount of time determined by the ambient exposure conditions. The wick 17 can be comprised of woven or non-woven, natural or synthetic fibrous materials. Blotter paper, filter paper, pulverized filter paper and fine silica gel, porous films containing polytetrafluoroethylene resin and silica gel, or non-woven spun bonded materials such as described in U.S. Pat. No. 5,120,137, incorporated herein by reference, may also be employed. The wicking material 17 may be coated with the appropriate sizing materials to alter the rate of permeation of the fluid organic material. The heat-fusible organic material 18 is deposited on at least one end of the wicking member 17. The primary component in the heat-fusible, organic material 18 of the device maybe be chosen singularly or in combination from those well known in the art to provide the critical melting temperature for the proper operation of the device. Heat-fusible alcohols, esters, ketones, acids, aldehydes, glycols, epoxides, ethers, aliphatic hydrocarbons, and aromatic hydrocarbons can be used. U.S. Pat. No. 5,368,905 incorporated herein by reference contains a partial list of useful materials of this kind that may be employed. Particularly useful materials for this purpose are the normal paraffins containing ten to twenty-five carbon atoms including but not limited to n-tridecane, n-tetradecane, n-pentadecane, n-hexadecane, n-heptadecane, n-octadecane and mixtures thereof. The heat-fusible material 18 may have blended or mixed within any compounds that are needed to change the viscosity thereof to regulate the rate of flow of the material 18 above the predetermined temperature, or materials that improve the ability to deposit material 18 on the wicking member 17. A dye or combination of dyes sufficiently soluble in the heat-fusible, organic material may be incorporated into the organic material to serve as a visual indication of the extent of permeation of the mobile material. Suitable dyes are well known in the art. A partial list of dyes is contained in U.S. Pat. No. 5,368,905 and is incorporated herein by reference. A dye precursor/dye activator system could also be employed. For example, a dye precursor could be printed along the wick prior to or at the viewing window, and the dye activator could be incorporated in the heat-fusible material. Upon contact of the dye precursor and dye activator due to migration of the heat-fusible substance, a color would be developed. If activation of the device is necessary, heat-fusible, organic materials or dyed, heat-fusible, organic materials can be microencapsulated and deposited on at least one end of the indicator device wick. The capsules can be ruptured by manual means or preferably by appropriate automated mechanical means to activate the device and initiate the monitoring function. The bottom layer 20 serves as a base sheet and can be comprised of the same plastic materials as the top layer 12 or of aluminum foil or film or of papers or of laminated structures of the kind mentioned above, provided that layer 20 serves as the appropriate non-interactive layer. In a preferred embodiment the layer 20 is opaque to provide a covering to conceal the inner components of the device. The layer 20 is sealed to the top layer 12 in a suitable pattern that surrounds wicking member 17 and heat-fusible material 18. The outer periphery of the sealing pattern does not contact, i.e. is outside of the wicking material 17 and heat-fusible material 18 and thus forms a pouch to completely seal the operational elements of the device without touching, i.e. contacting, these operational elements of the device. The pattern seal 22 can be formed with solvent or water based self-adhesive systems, UV or high energy cured radiation sensitive laminating or pressure sensitive adhesives, by heat sealing or by hot melt adhesives. It is important to prevent contact of the wicking member and dyed organic material from peripheral seal to preclude any adverse effect that the sealing means would have on the proper progression of the heat-fusible organic material 18 along the wick 17. The outer surface of the base layer 20 is coated with a self-adhesive layer 24 to allow attachment to a product container (not shown). The layer 24 may contain dyes or pigments to form an opaque back surface or to complement the opaqueness thereof. The outermost layer 25 is a release liner placed over the adhesive layer 24 that is removed prior to attachment of the device to the product article being monitored. For reasons of adhesive curing by UV radiation of peripheral seal, base layer 20 may be required to be colorless. If this is necessary, then an additional layer of opaque material, not shown, can be used to conceal the functional components from the back. This layer can be made from substrates as described above and whose function is to mask the inner components. Therefore substrates may include, paper, foils or the like to provide an opaque backing. In the plan view of FIG. 2 an indicator device with a clear top surface has been illustrated while FIG. 1 is illustrative of a finished device with an opaquely printed surface that contains a legend for the proper interpretation of the device. The opaque surface layer contains a window 15, also shown in broken line in FIG. 2, that is not printed or otherwise left transparent that is the viewing port to judge the progression of the mobile heat-fusible material 18 along the wick 17 for time above a pre-determined temperature. It should be understood that multiple windows can be used to determine incremental times above a critical temperature.

Figure 4:
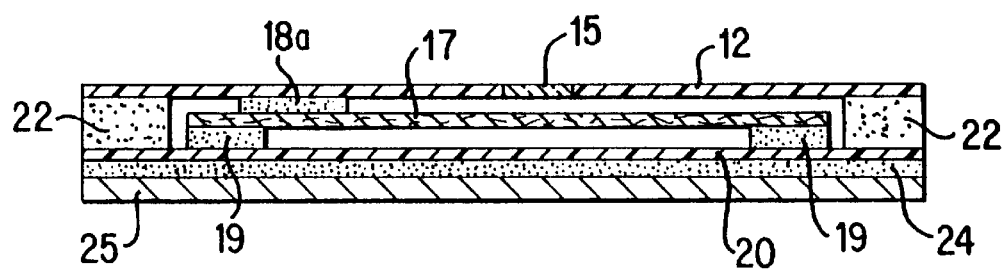
FIG. 4 is an alternative embodiment of the device of the invention in which the wicking member is secured to the bottom substrate.

Shown in FIG. 4 is a cross-sectional view of an alternative embodiment of an indicating device which shows the attachment of the porous member to a bottom substrate rather than the top layer. An important feature of the attachment of the porous wicking material only at the extremities of the wicking material is to minimize exposure of the heat-fusible substance 18a on the wicking material considering the adhesives employed and thus minimize any potential interactions that can cause erratic performance of the migration of the heat-fusible material from the adhesive. Available adhesives that are non-interactive and can be deposited in minimal quantities so as not to introduce any long term deleterious or interfering affect on the function of the device are preferably used.

Figure 5:
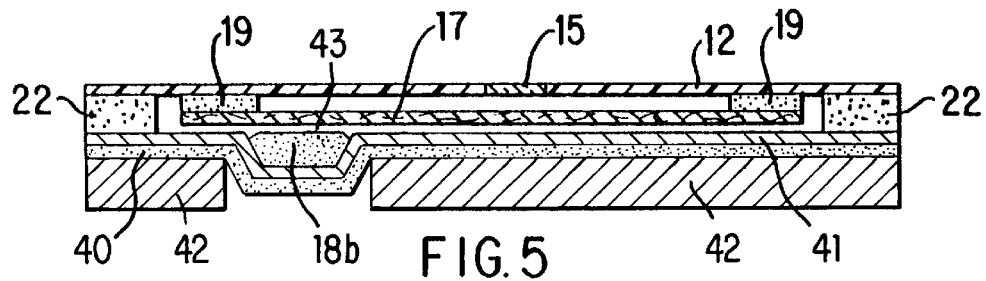
FIG. 5 illustrates an alternative embodiment which includes a protective layer with a recess in which a microencapsulated heat-fusible material is contained to safeguard against premature activation.

Shown in FIG. 5 is a cross-sectional view of another embodiment of the invention wherein the device comprises the adhesive layer 40 and a foil layer 41 in which a microencapsulated heat-fusible material 18b is contained. In this embodiment, the microencapsulated substance 18b is confined in the recess 43 and supported by the layer 41 and tag stock layer 42.

Figure 6:
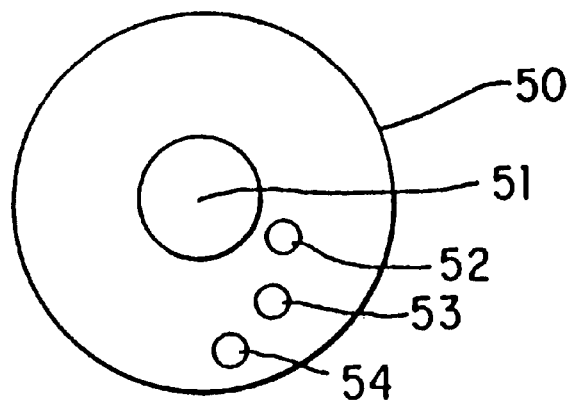
FIG. 6 is an alternative configuration comprising a circular device in which the wicking material is secured at the periphery and the heat-fusible material flows from the center radially.

The alternative embodiment illustrated in FIG. 6 comprises a circular configuration 50 in which the heat-fusible substance 51 is centrally positioned and upon activation migrates radially towards the outer periphery and may be visually observed at differing exposure stages in the windows 51 through 54.

Figure 7:
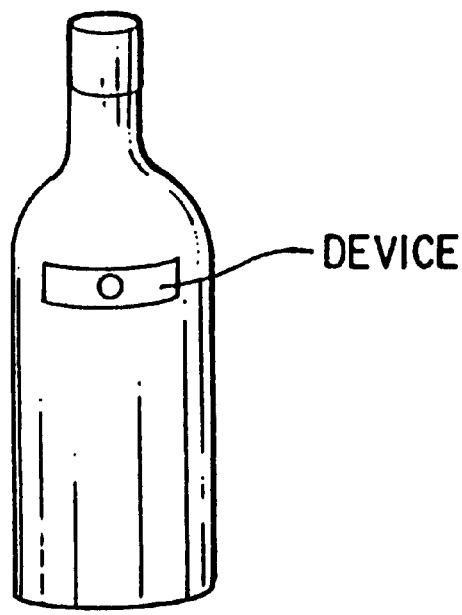
FIG. 7 illustrates the use of the device of the invention in the form of a label applied on and conforming to the contour of a wine bottle.
Figure 8:
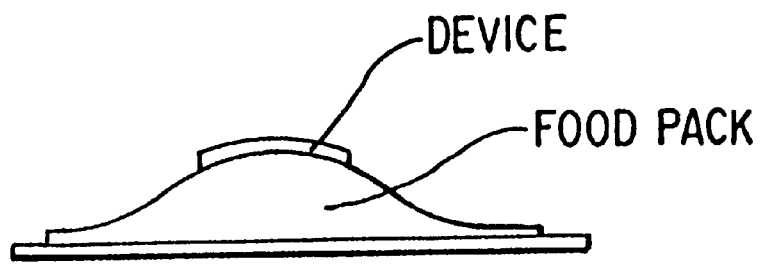
FIG. 8 illustrates the use of the device of the invention in the form of a label applied on and conforming to the contour of a conventionally packaged poultry item as normally purchased by a consumer in a food market.

FIGS. 7 and 8 illustrate the positioning of the indicator of the invention on containers which as a practical matter require that the indicator device conforms to the contour of the container.

The following examples are illustrative of the device of this invention.

EXAMPLE 1

A Gallus R250 (Gallus Inc. Newtown, Pa.) printing machine was used to prepare a time-temperature device in accordance with the invention. Ahlstrom filter paper grade #950 as the wicking element was screen printed to contact areas 19 (see FIG. 3 of the drawing) with RC 2008 UV-cured laminating adhesive from Electromek Co. Carlstadt, N.J. The printed paper was laminated with 0.002" clear polyester film 12. This film was screen printed on the top surface with an green ink with a 1/8" diameter hole in the print to form the viewing window 15. A legend comprising instructions for the use of the device was then printed. The filter paper being affixed to the top film layer was die cut around the two attachment points 19 to the top layer film without puncturing the top layer forming the wicking member 17. The wicking member 17 in this example was produced in a convenient barbell-type shape and the scrap matrix was removed. Various other shapes such as oval, circular, spiral may also be used instead of a barbell shape. The die cut in the form of a barbell is not the only form that can be used. Patterns of wicking material that have various circuitous, asymmetric, or constricted shapes for directing the flow of migrating materials may also be die cut dependent upon the required wicking time and viewing window position. A heat-fusible composition containing 95% n-octadecane (melting point 27.6° C. 81.7° F.), 2% Solvent red "O" dye, and 3% Elvax 4310 (E.I. Dupont, Wilmington, Del.). The dye and printing aid were chosen so as not to appreciably reduce the melting point nor substantially increase the viscosity of the pure octadecane. Choice of proper dye and printing aid compositions is determined by conventional techniques including differential thermal analysis and viscosity measurements. The mixture was heated to approximately 30° C. (86° F.) and screen printed in a pattern on one end of the wicking member 17 to form the heat-fusible organic layer 18. Approximately 2 mg of the layer 18 was deposited. The UV cured laminating adhesive was screen printed in a peripheral pattern 22 surrounding but not in contact with the wicking member and organic layer. A clear 0.001" polyester film was laminated to the structure to form a pouch around the wicking member, dyed heat-fusible components. A white polyester substrate coated on both surfaces with acrylic self adhesive and containing a release liner was laminated onto the clear polyester film. The structure was die cut around the perimeter through all the adhesive and substrate layers to the release liner to form the finished, supple, self-adhesive indicator device of this invention. The temperature of the finished devices was quickly reduced by placement in a refrigerator.

Devices produced as above were stored in a temperature controlled environment at 25±0.2° C. (77° F.), below the melting point of the heat-fusible material, for three months with no indication of color in the viewing window. Additional devices were attached to 750 ml bottles of wine and stored in a Hotpack Biological Chamber (Model 352602) at 26.7±0.3° C. (80° F.), below the melting temperature of the heat-fusible substance, for two weeks with no indication of color appearance in the viewing window. The temperature in the chamber was raised to 29.5° C. (85° F.), which is above the melting temperature of the heat-fusible material. The first indication of color appeared in the window after six hours of storage. A similar test was performed where the final temperature of the chamber was raised to 37° C. (98° F.). The devices expired in 3 hours under these conditions.

The dimensions of this device are 54 mm long, 29 mm wide, but only 0.4 mm (0.015") thick. A device such as this is consistent in thickness with ordinary labels used in conventional labeling operations, and contains no components that are significantly affected by normal handling and application apparatus with the exception of proper temperature control. Indicators prepared in this fashion must be properly stored below the critical temperature before use. An additional small viewing widow could be located near the origin of the migration front of the heat-fusible substance to assure that the device had not been exposed to the critical temperature for a brief time before use.

This example illustrates that indicator devices of the invention function in a manner consistent with the desired results of measuring integration of time above a predetermined temperature. This example shows further that these devices can be prepared on commercially available printing equipment that is capable of producing devices in large quantities, with conventional materials.

EXAMPLE 2

A device was prepared using the top layer 12 with the die cut wicking member 17 from Example 1. The perimeter seal 22 was screen printed manually on 12 with a UV cured self-adhesive IRR88 supplied by UCB Chemicals, Smyrna, Ga. The heat-fusible, organic substance was a mixture of n-tetradecane (melting point 5.8° C., 42.4° F.) with 2% Solvent Red "O" dye. 3 µL of this mixture was volummetrically deposited on one end of wicking member 17 and immediately sealed with a white polyester backing layer with self-adhesive layer and release liner. The assembled device was immediately placed in a freezer (−18° C., 0° F.) for several hours. This device was placed on a commercially available foam refrigerant pack sold by FCC Packaging, Inc. Medfield, Mass., that had been stored at 2.9° C. (37.2° F.). This pack was used to simulate a chilled food product. The simulated food product with indicator device attached thereto was stored at 2.9±0.2° C. (37° F.), below the melt point of 18 for 18 hours with no indication of color progression. The temperature was raised to 7.5° C. (46° F.), above the melt point of 18, red color appeared in the window 15 after approximately 7 hours.

EXAMPLE 3

A device was prepared using the top layer substrate 12 with the wicking member 17 from Example 1. The perimeter seal 22 was screen printed manually on 12 with a water-based self-adhesive WPS 4211 from Elektromek. Microcapsules containing a mixture of 6 parts n-tetradecane and 2 parts n-tridecane with 2.5% blue #36 dye were prepared by Lipo Technologies, Inc. Dayton, Ohio. The capsules were composed of 85% core material (alkanes and dye) and 15% wall material made from gelatin. The capsules were 75$\mu$ mean size and were slurried at a 30% concentration in a 15% solution of nitrocellulose in butyl cellosolve. This suspension of capsules was manually screen printed on the end of wicking member 17 and dried in an oven to form an activatable layer 18 heat-fusible substance. The perimeter seal 22 was formed as in example 2, utilizing the same adhesives and backing layer 20. The construction of this type was stored at room temperature for a week with no appearance of the color in the viewing window 15. This shows that the heat-fusible material is entrapped in the microcapsules. The capsules were ruptured at room temperature with the rounded, blunt end of a pen and left at room temperature. The color was apparent in the viewing window after about 18 hours. This device was 0.4 mm thick. In general, devices of this kind should have a thickness that permits practical flexing to allow it to conform to surfaces on which the label device is affixed, preferably a thickness on the order of 1.3 mm or less.

EXAMPLE 4

It is known that the amount of heat-fusible material deposited on a wicking member will determine the rate of progression of the color along the wicking member. To increase the amount of microcapsules deposited on a device thereby increasing the speed of the color front, an aluminum foil base substrate (0.001") was embossed to form a small well of approximately 0.26" diameter and 0.020" deep. A layer to inhibit crushing of the microcapsules was prepared from 8 point tag stock with a 0.4" diameter hole punched through to form the protective hole and affixed to the bottom substrate layer. A self-adhesive sheet with release liner was applied to the back surface. Microcapsules containing n-tridecane (melting point −5.4° C., 22.3° F.) and 1.6% blue #36 dye were prepared by Lipo Technologies, Inc. Dayton, Ohio. The capsules were composed of 88% core material (tridecane and dye) and 12% wall material made from gelatin. The capsules were 83$\mu$ mean size and were slurried at a 15% concentration in 2% aqueous Klucel. 50 $\mu$L of this suspension was volummetrically deposited into the well and dried to form a layer of microencapsulated heat-fusible material. The wicking member and top layer from Example 1 was sealed to the bottom layer containing the protected microcapsules with a UV-cured self-adhesive, thus forming the finished device. The indicator device was 0.9 mm thick. The device showed no indication of color for over one week. The release liner was removed from back and the device was activated by applying pressure in the area of the microcapsules. The indicator device was placed in a freezer below the melting point of the heat-fusible substance for 18 hours with no sign of the color in the viewing window. The indicator was moved to a temperature of 1.6° C. (35° F.), which is above the melting temperature of the material. Color was observed in the viewing window after three hours.

While the preferred embodiments of the present invention have been described, it should be understood that various changes, modifications and adaptations may be made within the contemplation of the invention without departing from the spirit of the invention and the scope of the appended claims.

What is claimed is:

1. A pliable time-temperature indicator for signaling the exposure of a product to a pre-determined temperature above a pre-determined temperature and after a period of time that is integrated with said temperature comprising in combination:

(a) a substrate layer adapted to be adhered at its underside to a container;

(b) a surface layer;

(c) a wicking member between said substrate and surface layers that is adhered substantially only at the extremities of the member to the surface of one of said substrate or surface layers; and (d) a microencapsulated heat-fusible substance, which, melts and flows above a pre-determined temperature, applied on the surface of the wicking member and contiguous with at least one of the ends of said wicking member and which, after being exposed to a temperature above said predetermined temperature, flows along the length of said wicking member; said (e) surface layer being superimposed over said wicking member and heat-fusible substance and, in conjunction with said substrate layer, encapsulating said wicking member and heat-fusible substance, said surface layer being provided with a sight window at an intermediate location over said wicking member and through which progress of flow on the wicking member of said heat-fusible substance is observable.

2. The indicator in accordance with claim 1 wherein the substrate layer and the surface layer are inherently sealable layers.

3. The indicator in accordance with claim 1 in which the surface layer is printable and transparent.

4. An indicator in accordance with claim 1 in the form of a label in which the surface layer is printable and wherein the indicator has a maximum thickness of 1.3 mm.

5. The indicator of claim 1 in which the microencapsulated heat-fusible substance is contained within a recess configured in the substrate layer, said substrate layer being an embossable layer.

* * * * *